Figure 1:
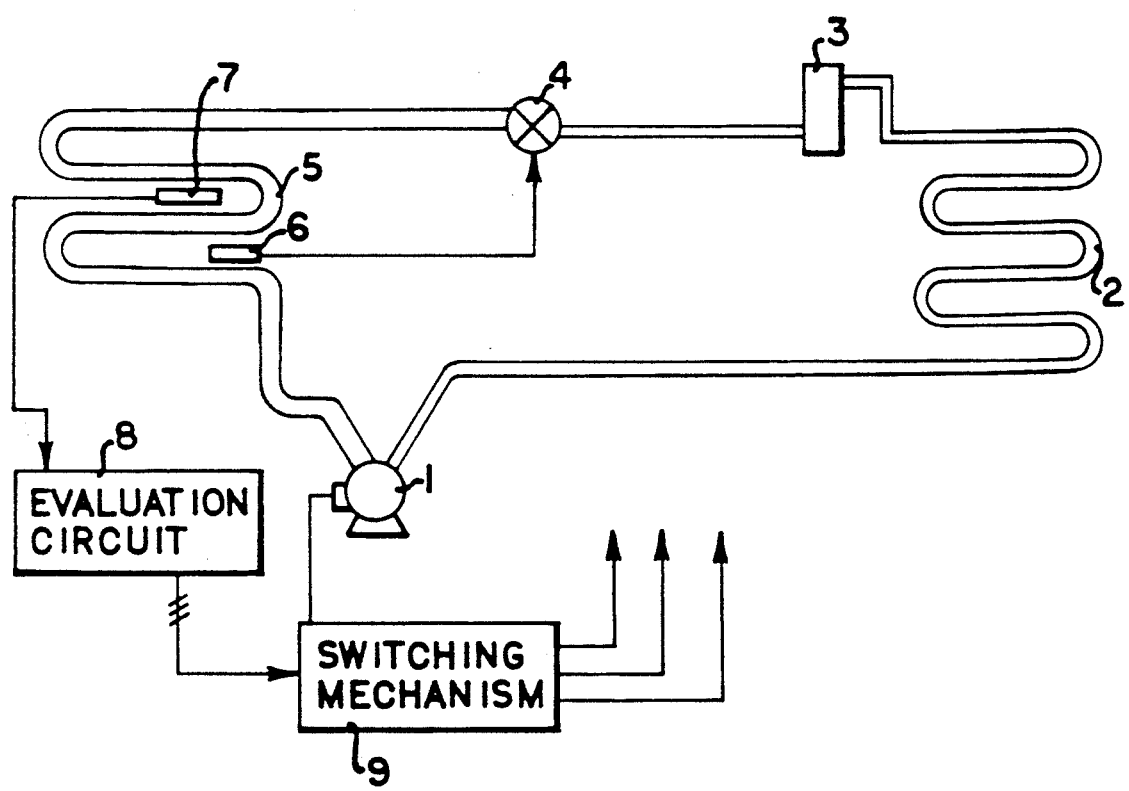

United States Patent [19]

Bendtsen

[11] Patent Number: 5,214,930
[45] Date of Patent: Jun. 1, 1993

[54] METHOD FOR REGULATING THE TEMPERATURE OF A MEDIUM BY MEANS OF A TEMPERATURE CONTROL LOOP, AND A TEMPERATURE-REGULATING DEVICE FOR IMPLEMENTING THE METHOD

[75] Inventor: Christian Bendtsen, Sydals, Denmark

[73] Assignee: Danfoss A/S, Nordborg, Denmark

[21] Appl. No.: 878,445

[22] Filed: May 4, 1992

[30] Foreign Application Priority Data

May 6, 1991 [DE] Fed. Rep. of Germany ....... 1414700

[51] Int. Cl.$^5$ ............................................. F25B 1/00
[52] U.S. Cl. ......................................... 62/115; 62/227
[58] Field of Search .................... 62/227, 115, 175; 236/78 D, 1 EA, 1 E

[56] References Cited

U.S. PATENT DOCUMENTS

| | | | |
|---|---|---|---|
| 4,356,961 | 11/1982 | Smith | 62/175 X |
| 4,379,483 | 4/1983 | Farley | 62/175 X |
| 4,628,700 | 12/1986 | Alsenz | 62/227 X |

Primary Examiner—William E. Wayner
Attorney, Agent, or Firm—Wayne B. Easton

[57] ABSTRACT

Method and apparatus for controlling a prior art refrigeration system of the type having an evaporator, a variable capacity compressor arrangement, and switching apparatus between a control unit and the compressor arrangement. The compressor arrangement thereof has adding and subtracting inputs which translate input signals to respectively increase or decrease step by step the effective capacity of the compressor arrangement. The switching apparatus thereof has adding and subtracting inputs and outputs and a reset output which is made effective after each increase or decrease of the effective capacity of the compressor arrangement. The method and apparatus herein involves processing a data signal which is indicative of the temperature status of the evaporator. The data signal is compared with predetermined upper and lower temperature limits of an operating range for the evaporator and adding or subtracting temperature control signals are respectively putted when the data signal is higher or lower than those limits. The data signal has successive samples thereof examined to determined if it is rising or falling and differentiated signals are outputted depending on whether the value of a succeeding data signal is larger or smaller than the value of a preceding data signal. The adding and subtracting temperature control signals and the adding and subtracting differentiated signals are respectively ANDed and the resulting signal is applied to the adding or subtracting input of the switching apparatus. The availability of the differentiated signals for the ANDing operation are delayed for predetermined periods of time initiated by the switching apparatus.

2 Claims, 3 Drawing Sheets

METHOD FOR REGULATING THE TEMPERATURE OF A MEDIUM BY MEANS OF A TEMPERATURE CONTROL LOOP, AND A TEMPERATURE-REGULATING DEVICE FOR IMPLEMENTING THE METHOD

The invention is concerned with a method for regulating the temperature of a medium by means of a temperature control loop, which comprises a coolant circuit with a compressor arrangement having a capacity adjustable step-by-step, a condenser, an expansion device and an evaporator; a measuring signal representing the actual value of the temperature to be regulated is generated and compared with the upper and lower limit of a neutral zone extending on both sides of a desired value of the temperature to be regulated and, depending on whether the measuring signal exceeds or falls below the neutral zone, an output stage of the compressor arrangement is switched on or off with a delay.

The invention is furthermore concerned with a temperature-regulating device having such a temperature control loop for implementing the method, with a temperature detector for generating the measuring signal, with a comparator for comparing the measuring signal with the upper and lower limit of the neutral zone and with a switch mechanism which, depending on whether the measuring signal exceeds or falls below the neutral zone, causes an output stage of the compressor arrangement to be switched on or off by way of time-delay elements.

In a known temperature-regulating device of this kind (US-PS 4 825 662) for a temperature control loop which comprises a refrigerating system, an ON-delay element or an OFF-delay element is actuated when the temperature-measuring signal exceeds or falls below the upper and lower limit respectively, and if the measuring signal exceeds or falls below the relevant limit beyond the running time of the time-delay element, a compressor stage is switched on and off respectively.

If in this case the system has a high thermal inertia, so that the temperature detector does not establish a change in temperature until comparatively late after the compressor stage has been switched on or off, there is a danger that yet a further compressor stage will be switched on or off and that the desired value will be far exceeded or fallen below, and possibly that even sustained oscillations may occur.

The invention is based on the problem of providing a method and a temperature-regulating device of the kind mentioned in the preamble, with which extreme oscillations about the desired value are avoided and after the neutral zone has been reached only a few output stages are to be switched on or off.

According to the invention, this problem is solved in that there the measuring signal is continuously monitored for rise and fall, a first predetermined delay time is initiated when the course of the measuring signal changes from falling to rising, a second predetermined delay time is initiated when the course of the measuring signal changes from rising to falling, switching of an output stage of the compressor arrangement on or off is initiated when the upper limit of the neutral zone is exceeded or fallen below and the first delay time has elapsed, and switching of an output stage of the compressor arrangement off or on is initiated when the lower limit of the neutral zone is fallen below or exceeded and the second delay time has elapsed.

Here, in the case of a refrigerating system, an output stage of the compressor arrangement is switched on, whereas in the case of a heat pump it is switched off, when the measuring signal continues to exceed the upper limit of the neutral zone after expiry of the first delay time. On the other hand, an output stage of the compressor arrangement is switched off in the case of a refrigerating system and switched on in the case of a heat pump when the measuring signal continues to fall below the lower limit of the neutral zone after expiry of the second delay time.

The delay therefore commences as soon as a temperature change based on a change in the refrigerating capacity of the compressor arrangement is established, so that the re-setting of the compressor output is effected as soon as one of the limits of the neutral zone is exceeded or fallen below. Large oscillations of the temperature about the desired value or sustained oscillations are avoided in this manner. On the contrary, the temperature remains largely constant within the neutral zone. Within the neutral zone the refrigerating capacity of the compressor arrangement is not changed over. On the contrary, the refrigerating capacity is not changed until both a limit of the neutral zone is exceeded or fallen below and the running time or delay time of a time-delay element has expired. If within the delay time no limit is fallen below or exceeded, and the change in the measuring signal does not change its sign, no output stage of the compressor arrangement is switched on or off.

The temperature-regulating device according to the invention is constructed so that the measuring signal can be supplied to a differentiating circuit with two outputs, that an output signal appears at one output of the differentiating circuit whenever the measuring signal rises, and that an output signal appears at the other output of the differentiating circuit whenever the measuring signal falls, that these output signals prime the switch mechanism by way of a respective time-delay element, that the switch mechanism is actuated after expiry of the respective delay time whenever the comparator supplies a signal when one of the two limits is exceeded or fallen below, and that at least the relevant time-delay element is re-set on actuation of the switch mechanism.

By this means, the differentiating circuit monitors the measuring signal (or the temperature) continuously or at least at very short intervals to establish whether it is rising or falling. When the change in the measuring signal alters from falling to rising, the first time-delay element is actuated When, however, the change in the measuring signal alters from rising to falling, the second time-delay element is actuated.

A development of the invention may consist in that the one output of the differentiating circuit is connected by one time-delay element to one input of a first logic element, and the other output of the differentiating circuit is connected by a second time-delay element to one input of a second logic element, that the output of the first logic element is connected to a switching input of the switch mechanism for switching on or off an output stage of the compressor arrangement, and the output of the second logic element is connected to a switching input of the switch mechanism for switching off or on an output stage of the compressor arrangement, that the comparator has a first output which is connected to the other input of the first logic element and at which an output signal appears when the measuring signal exceeds the upper limit of the neutral zone, that the comparator has a second output which is connected to the other input of the second logic element and at which an output signal appears when the measuring signal falls below the lower limit, and that switching signals appear at the outputs of the logic elements as soon as and as long as output signals of the connected outputs appear at their two inputs.

Preferably, provision is made for the comparator to have a third and a fourth output which are connected to the switch mechanism by way of logic elements which can be enabled in dependence on delayed resetting signals of the switch mechanism, for an output signal to appear at the third output as long as the measuring signal is greater than a maximum value lying above the upper limit of the neutral zone, for an output signal to appear at the fourth output of the comparator as long as the measuring signal is smaller than a relatively low value lying below the lower limit of the neutral zone, and for a respective further output stage of the compressor arrangement to be switched on or off at identical short intervals by the switch mechanism for the duration of an output signal at the third or fourth output. For example, in this case every thirty seconds an output stage of the compressor arrangement can be switched on or off. The temperature is returned to the neutral zone very quickly in this manner.

A further development can consist in that the comparator has a fifth output, at which an output signal appears as long as the measuring signal is smaller than a value lying below the relatively low value, below which, when the control arrangement is being used in a refrigerating system, there is danger of the refrigerated goods becoming frosted, and in that, at even shorter identical intervals, for the duration of the output signal at the fifth output, in each case a further output stage of the compressor arrangement can be caused to be switched off by the switch mechanism. In this case, for example, one output stage of the compressor arrangement can be switched off every second so that risk of frost is avoided as quickly as possible.

Preferably, provision is furthermore made for the differentiating circuit to have two memory units arranged one behind the other and a subtractor, for the outputs of the memory units to be connected to a respective one of the inputs of the subtractor, and for the first memory unit to have sampled values of the measuring signal supplied to it periodically and, on being supplied with a new sampled value, for the previous contents of the first memory unit to be transferrable to the second memory unit. In this case, the measuring signal can be sampled, for example, every ten seconds, and the sampled value can be transferred to the first memory unit whilst simultaneously the sampled value previously stored in the first memory unit is transferred to the second memory unit. The sampled values stored in the memory units are then compared with one another. It is thus possible to determine in simple manner whether the temperature is rising or falling.

Preferably, provision is furthermore made for the subtractor to by formed by the comparator. It is thus able to carry out both functions in a time-division multiplex process.

Figure 2:
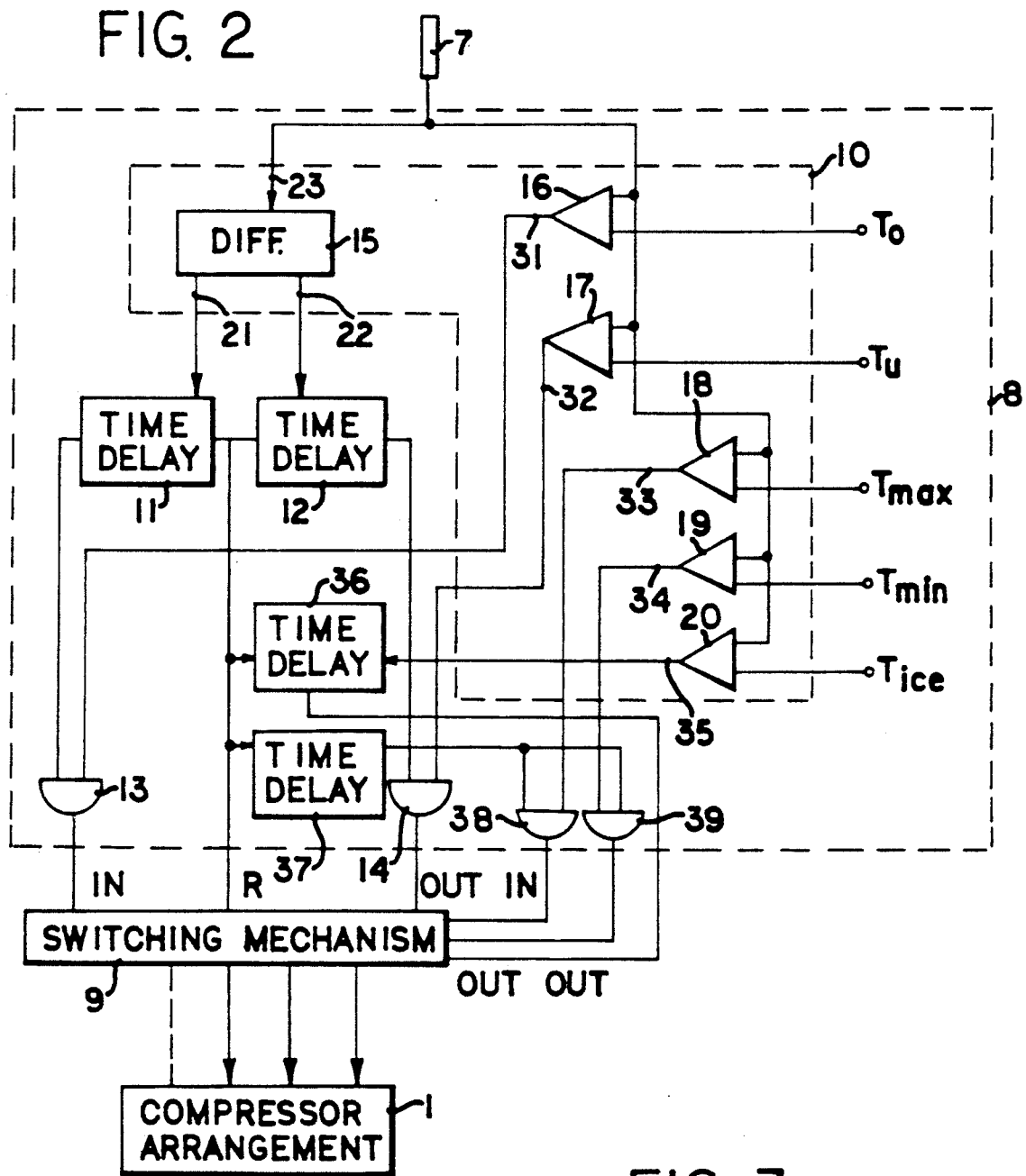
Figure 3:
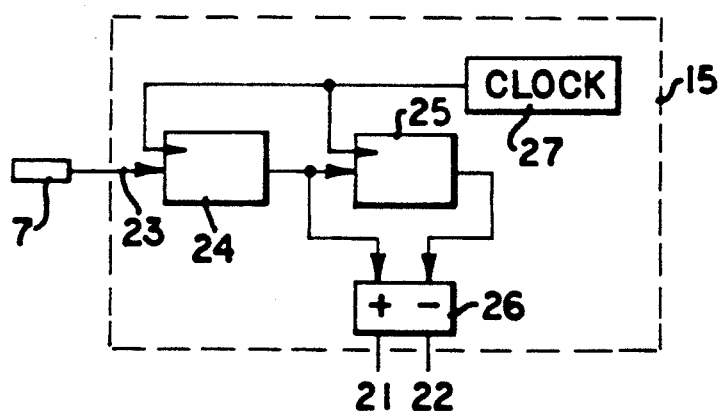
Figure 4:
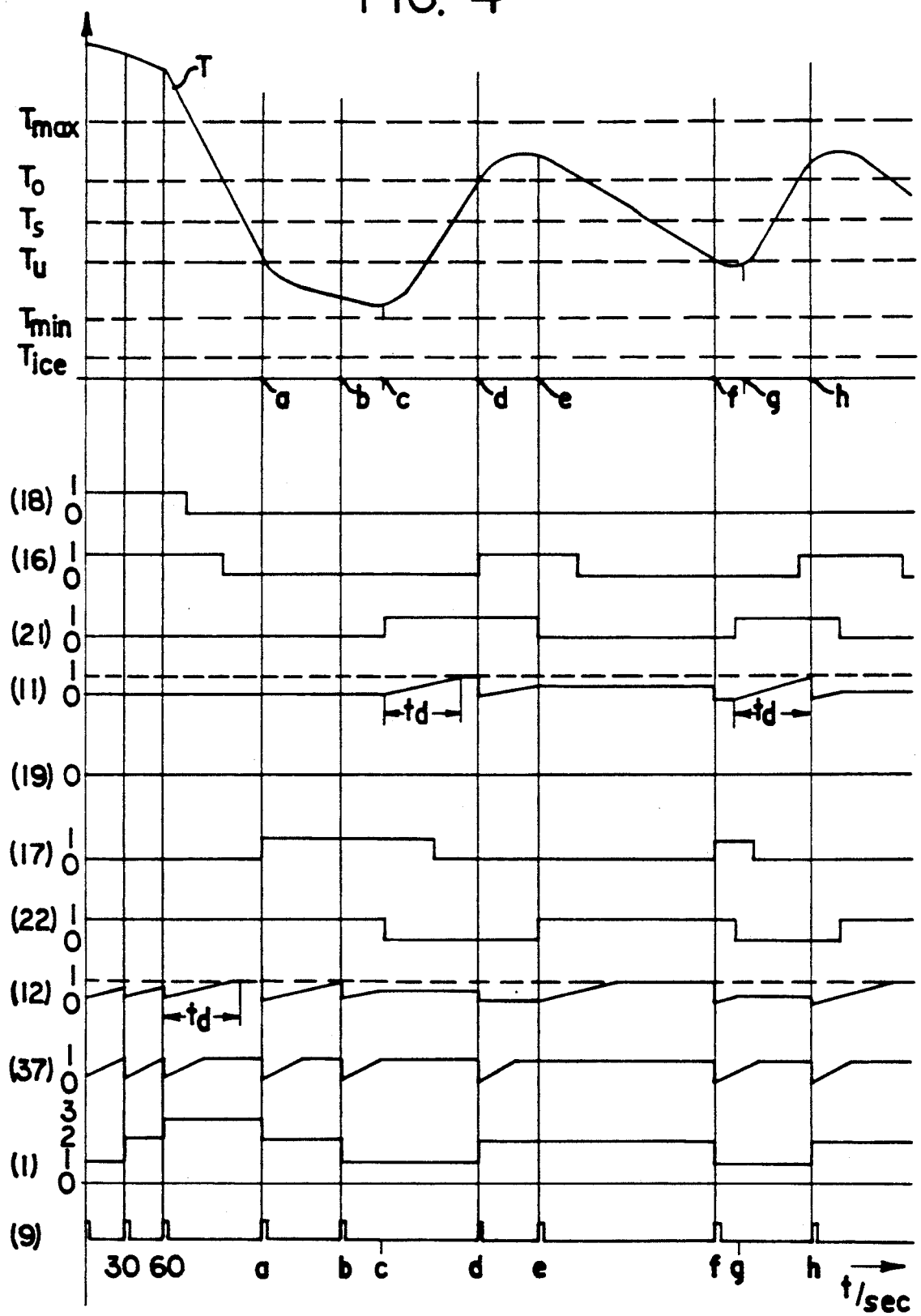

The invention and its developments are described in detail hereinafter with reference to the drawing of a preferred embodiment. In the drawings:

FIG. 1 is a diagrammatic representation of a temperature control loop with a refrigerant circuit and a temperature-regulating arrangement according to the invention, FIG. 2 is a somewhat more detailed block diagram of an embodiment of a temperature-regulating arrangement according to the invention, FIG. 3 shows an embodiment of a differentiating circuit in the temperature-regulating arrangement according to the invention shown in FIG. 2, and FIG. 4 shows the course of the output signals of individual components in the block diagram according to FIG. 2 as a function of the course of the temperature T to be regulated, or of the measuring signal representing this temperature.

According to FIG. 1, the refrigerant circuit contains a compressor arrangement 1 with an output adjustable step-by-step, for example by switching on and off one or more cylinders, or several separate refrigerating compressors which can be switched on or off individually or together, as indicated by additional output lines of the switch mechanism 9. If several compressors are used, they are connected in parallel on the suction and pressure sides The compressed refrigerant is supplied by way of the pressure-side line to a condenser 2, in which it is liquefied. From the output of the condenser 2 the refrigerant passes to a collector tank 3. From the collector tank 3 the refrigerant is supplied to an expansion arrangement 4, which in turn feeds it to an evaporator 5. The refrigerant is sucked by the compressor arrangement 1 from the output of the evaporator 5 again. The expansion arrangement 4 controls the through-flow of the refrigerant in dependence on the superheat temperature of the refrigerant, which is measured by means of a temperature detector 6 at the output of the evaporator 5.

The evaporator 5 serves for cooling a coolant, for example air, which is supplied by a fan, not illustrated, by way of the evaporator 5 to a space to be cooled, or serves for cooling water. The temperature of the coolant is measured by a detector 7. The temperature detector 7 is a thermistor sensor. The measuring signal of the temperature detector 7 is supplied to an electrical evaluation circuit 8 which feeds switching signals to a switch mechanism 9 in dependence on the magnitude of the measuring signal and a desired temperature value. The switch mechanism 9 then switches one or more output stages of the compressor arrangement 1 on or off in dependence on the switching signals supplied to it.

The refrigerant circuit illustrated in FIG. 1 can also be used for a heat pump; the temperature detector 7 would then be arranged in an air current guided over the condenser 2 and dissipating the heat of the condenser 2.

FIG. 2 is a diagrammatic representation of an embodiment of the evaluation circuit 8. The evaluation circuit 8 illustrated contains a comparator 10, four time-delay elements 11, 12, 36, 37 and four logic elements 13, 14, 38 and 39 in the form of AND-gates.

The comparator 10 contains a differentiating circuit 15 and five comparators 16 to 20.

The differentiating circuit 15 has two outputs 21 and 22 and one input 23. The measuring signal of the temperature detector 7 is supplied to the input 23 of the differentiating circuit 15. When the change in the measuring signal alters from falling to rising, the differentiating circuit 15 causes an output signal to appear at its first output 21, and causes an output signal to appear at its second output 22 when the change in the measuring signal alters from rising to falling. The first output 21 of the differentiating circuit 15 is connected by the one logic element 11 to the one input of the logic element 13 and the second output 22 of the differentiating circuit 15 is connected by the second logic element 12 to the one input of the second logic element 14. The output of the first logic element 13 is connected to a switching input of the switch mechanism 9 for switching on an output stage of the compressor arrangement 1, and the output of the second logic element 14 is connected to a switching input of the switch mechanism 9 for switching off an output stage of the compressor arrangement 1.

In addition to the outputs 21 and 22, the comparator 10 has five further outputs 31 to 35, which at the same time form the outputs of the comparators 16 to 20. The measuring signal of the temperature detector 7 is supplied to one input of the comparators 16 to 20. An upper limit value $T_o$ of a neutral zone is supplied to the other input of the comparator 16 and a lower limit value $T_u$ of the neutral zone is supplied to the other input of the comparator 17, the neutral zone extending both sides of a desired temperature value $T_s$ (FIG. 4). An adjustable maximum value $T_{max}$ of the temperature which lies above the upper limit $T_o$ is supplied to the other input of the comparator 18. An adjustable lower value $T_{min}$ which lies below the lower limit $T_u$ is supplied to the other input of the comparator 19. An adjustable value $T_{ICE}$, which is even lower than the lower value $T_{min}$ and somewhat above the frost limit of 0° C. is supplied to the other input of the comparator 20.

The output 31 of the comparator 10 simultaneously forms the output of the comparator 16 and is connected to the other input of the first logic element 13. An output signal appears at this output 31 when the measuring signal exceeds the upper limit $T_o$ of the neutral zone. The output 32 of the comparator is connected to the other input of the second logic element 14. An output signal appears at this output 32 when the measuring signal falls below the lower limit $T_u$. Switching signals appear at the outputs of the logic elements 13 and 14 as soon as and as long as output signals of the time-delay elements 11 and 12 and of the connected outputs 31 and 32 of the comparator 10 appear at the two inputs of the logic elements 13 and 14.

A resetting output R of the switch mechanism 9 is connected to resetting inputs of the time-delay elements 11, 12, 36 and 37. The output of the comparator 20 is connected to a further input of the time-delay element 36. The output of the time-delay element 36 is connected to a switching input of the switch mechanism 9 for switching off an output stage of the compressor arrangement 1. The output of the time-delay element 37 is connected to one input of the logic elements 38 and 39. The output 33 of the comparator 18 is connected to the other input of the logic element 38 and the output 34 of the comparator 19 is connected to the other input of the logic element 39.

The delay time $t_d$ of the time-delay elements 11 and 12 is adjustable and is about 60 to 600 s, the set value being dependent of the delay time of the particular temperature-control loop. The delay time of the time-delay element 36 is about 1 s and that of the time-delay element 37 about 30 s. The delay time of the time-delay elements 11 and 12 starts to run again on receipt of a reset pulse from the resetting output R of the switch mechanism 9, as long as they are receiving an output signal from the differentiating circuit 15. On the other hand, the delay time of the time-delay elements 11 and 12 is not started until they have been reset to zero and receive an output signal of the differentiating circuit 15. The same applies to the time-delay element 36. The time-delay element 37 on the other hand is started again by each reset pulse from the resetting output R. The switch mechanism 9 produces a reset pulse at the resetting output R on each change-over (switching on or off) of an output stage of the compressor arrangement 1.

If, after an alteration in the change of the measuring signal from falling to rising, an output signal appears at the first output 21 of the differentiating circuit 15, the time-delay element 11 does not supply an input signal to the one input of the logic element 13 until the delay time of the time-delay element 11 has expired. If during the delay or running time of the time-delay element 11 an output signal appears at the output 31 of the comparator 10 and disappears again because the measuring signal has briefly exceeded the upper limit $T_o$ and fallen below it again, a switching signal that would lead to a further output stage of the compressor arrangement 1 being switched on does not appear at the output of the logic element 13. If, however, during the running time of the time-delay element 11 the measuring signal of the detector 7 exceeds the upper limit $T_o$ and even after expiry of the delay time of the time-delay element 11 remains above the upper limit $T_o$, a switching signal appears at the output of the logic element 13 and is supplied to the switch-on input of the switch mechanism 9, so that the switch mechanism 9 switches on a further output stage of the compressor arrangement I, resulting in more intensive cooling.

If, on the other hand the change in the measuring signal alters from rising to falling, an output signal that actuates the time-delay element 12 appears at the output 22 of the differentiating circuit 15. After expiry of the delay or running time of the time-delay element 12, an output signal appears at its output which is supplied to the one input of the second logic element 14. If, during the delay time of the time-delay element 12, an output signal appears at the output 32 of the comparator 10 or the comparator 17 and disappears again immediately, before the delay time has expired, because the measuring signal has only briefly fallen below the lower limit $T_u$ of the neutral zone, no switching signal appears at the output of the logic element 14 which would lead to an output stage of the compressor arrangement 1 being switched off. If, on the other hand, the measuring signal still remains below the lower limit $T_u$ after expiry of the delay time of the time-delay element 12, a switching signal appears at the output of the logic element 14 so that the switch mechanism 9 switches off an output stage of the compressor arrangement 1.

An output signal appears at the output 33 of the comparator 10 as long as the measuring signal is greater than the maximum value $T_{max}$ lying above the upper limit $T_o$ of the neutral zone. An output signal appears at the output 34 of the comparator 10 as long as the measuring signal is less than the lower value $T_{min}$ lying below the lower limit $T_u$ of the neutral zone. Throughout the duration of an output signal at the output 33 or 34 the switch mechanism 9 causes one further output stage in each case of the compressor arrangement 1 to be switched on or off at short intervals of about 30 seconds.

An output signal appears at the output 35 whenever the measuring signal falls below the value $T_{ICE}$ of the temperature, at which the refrigerated goods are exposed to the danger of frost. If an output signal appears at the output 35 of the comparator 10, the switch mechanism 9 causes one further output stage in each case of the compressor arrangement 1 to be switched off at even shorter intervals of about 1 second throughout the duration of the output signal at the output 35, so that danger of frost is avoided as quickly as possible.

The mode of operation of the temperature-control loop as shown in FIG. 4 is described below, in which at the top an example of a course of the temperature T of the detector 7 to be controlled, or the measuring signal representing this temperature, is illustrated, and in which, at the bottom, the course of the associated output signals of the components 1, 9, 11, 12, 16, 17, 18, 19, 21, 22 and 37 is illustrated, the individual diagrams of the output signals being provided with the same reference numbers at used for the relevant components in FIG. 2. It should be noted that the portions of the output signals of the time-delay elements 11, 12 and 37 shown rising linearly are shown in this manner for reasons of clarity. These portions represent running times of the time-delay elements, the output signals of the time-delay elements during these portions in fact being zero and not appearing until the end of the maximum running or delay time of these time-delay elements (as logic "1" signals).

As is apparent from FIG. 4, in the temperature-regulating arrangement at temperatures T above $T_{max}$ and below $T_{min}$ the fixed delay time of the time-delay element 37, in the example about 30 seconds, becomes effective when an output signal appears at the output 33 of the comparator 18 or at the output 34 of the comparator 19; after expiry of the delay time an output stage of the compressor arrangement I is switched on or off. When the temperature $T_{ICE}$ is fallen below, output stages of the compressor arrangement 1 are switched off by way of the time-delay element 36 with a relatively short delay time, here about 1 s, as long as the comparator 20 is generating an output signal.

As soon as the temperature drops below $T_u$ or exceeds $T_o$, the delay time $t_d$ of the time-delay elements 11 and 12 is applied. Every time an output stage of the compressor arrangement 1 is switched on or off, Diagram (1), the switch mechanism 9 produces a reset pulse at the resetting output R, Diagram (9), which resets all time-delay elements 11, 12, 36 and 37 to zero.

It is also possible, however, for the time-delay elements 11 and 12 to be reset independently of one another.

According to FIG. 4, the temperature T drops rapidly after the third output or compressor stage has been switched on, Diagram (1), and falls below $T_{max}$ so that the output signal of the comparator 18 disappears before the delay time of the time-delay element 37 has elapsed. The longer delay time $t_d$ of the time-delay element 12 therefore becomes automatically effective. When the delay time $t_d$ expires, the time-delay element 12 produces an output signal until the time a at which the temperature T falls below the lower limit $T_u$. At this time a, at the output of the comparator 17 there appears an output signal which is combined with the output signal of the time-delay element 12 by the logic element 14 to form an output signal which switches off the third output stage of the compressor arrangement 1 by way of the switch mechanism 9, Diagram (1). By switching off the third output stage, at the time a a reset pulse is produced, Diagram (9), which resets the time-delay element 12 to zero, Diagram (12), the time-delay element 12 starting up again immediately because an output signal continues to appear at the output 22 of the differentiating circuit 15, Diagram (22). As soon as the further delay time of the time-delay element 12 has expired, which is the case at time b, a further output stage of the compressor arrangement 1 is switched off. The time-delay elements 11 and 12 are again reset; because, however, the temperature is still dropping a little, the time-delay element 12 starts to run again, Diagram (12), but without expiring, because the temperature T starts to rise at the time c and this change in the temperature from falling to rising at time c is indicated by delivery of an output signal at the output 21 of the differentiating circuit 15, Diagram (21), whilst at the same time the signal present at the output 22 previously during the temperature drop disappears, Diagram (22). The output signal at the output 21 of the differentiating circuit 15 now trips the time-delay element 11, Diagram (11), and after expiry of the delay time $t_d$ of the time-delay element 11 an output signal which is fed to the logic element 13 appears at the output of the time-delay element.

At the time d, the temperature T exceeds the upper limit $T_o$ of the neutral zone, so that the comparator 16 delivers an output signal, Diagram (16), and now an output stage of the compressor arrangement 1 is switched on again by way of the time-delay element 13, Diagram (1). At the same time, a reset pulse is produced by the switch mechanism 9 which resets the time-delay elements. After some time, at the time e, the differentiating circuit 15 establishes that the temperature T is no longer rising, but is starting to fall, after which the output signals at the outputs 21 and 22 change, Diagrams (21) and (22), and the time-delay element 12 is actuated, Diagram (12). After expiry of the delay time of the time-delay element 12, this time-delay element produces an output signal, and after a further time, at a time f, the lower limit $T_u$ is fallen below so that the comparator 17 produces an output signal, Diagram (17), which, by being combined by the logic element 14 with the output signal of the time-delay element 12 still present, switches off an output stage of the compressor arrangement 1, Diagram (1). The time-delay elements are again reset by a reset pulse, Diagram (9), and start to run again, with the exception of the time-delay element 12. Before the delay time of the time-delay element 12 has expired, the temperature T starts to rise again at the time g. The signal then appearing at the output 21 now actuates the time-delay element 11 again, Diagrams (21) and (11). The delay time $t_d$ of the time-delay element 11 does not expire again until the time h. Shortly before this, the temperature T had again exceeded the upper limit $T_o$. A switch-on signal for an output stage of the compressor arrangement 1 is therefore not released by the logic element 13 until the time h.

FIG. 3 illustrates an example of the differentiating circuit 15. It contains a memory comprising two memory units 24 and 25 arranged one behind the other, which form a shift register Their outputs are connected to a respective one of the inputs of a subtractor 26, and a clock generator 27 feeds shift pulses to the memory units 24, 25 so that the first memory unit 24 connected on the input side to the temperature detector 7 is periodically supplied with sampled values of the measuring signal and when a new sampled value is supplied, the previous contents of the first memory unit 24 are transferred to the second memory unit 25. With each clock pulse of the clock generator 27 the subtractor 26 therefore compares two successive sampled values of the measuring signal, and produces an output signal at the output 21 when the new sampled value is greater than the previous value and thus the measuring signal is rising, whereas it produces an output signal at the output 22 when the new sampled value is lower than the previous value, and thus the measuring signal is falling.

A modification of the temperature-regulating arrangement illustrated in FIG. 2 can have the form that the comparator 20 is omitted, the output of the logic element 13 is connected to a switch-off input of the switch mechanism 9, the output of the logic element 14 is connected to a switch-on input of the switch mechanism 9, the output of the logic element 38 is connected to a switch-off input of the switch mechanism 9 and the output of the logic element 39 is connected to a switch-on input of the switch mechanism 9. Such a temperature-regulating arrangement would then be suitable for a heat pump instead of a refrigerating system, if the temperature detector 7 were to be arranged in an air current dissipating the heat of the condenser 2 and supplied to a space or similar to be heated.

An alternative construction of the temperature-regulating arrangement illustrated in FIG. 2 can have the form that, instead of the subtractor 26 and the five comparators 16 to 20, a single subtractor or comparator is used, which is connected successively (time-division multiplex method) on the input side cyclically to the temperature detector 7 and to transducer or memory units supplying the values $T_o$, $T_u$, $T_{max}$, $T_{min}$, and $T_{ICE}$, and is connected on the output side synchronously therewith cyclically to the associated outputs 21, 22 and 31 to 35. The connection can be provided by means of synchronised rotating rotary switches or electronic change-over devices in the form of AND-gates and OR-gates, the change-over devices being rendered conducting by a clock counter having several outputs to which an output signal is applied cyclically. A comparator of this kind can be realised in a simple manner by means of a microcomputer.

The time-delay elements 11, 12, 36 and 37 can be analogue time-delay elements or timing elements in the form of counting devices.

I claim:

1. A control system for a refrigeration system of the type comprising evaporator means, a variable capacity compressor arrangement for supplying said evaporator means, and switching means between said control unit and said compressor arrangement, said compressor arrangement having adding and subtracting inputs which translate input signals thereon to respectively step by step increase or decrease the effective capacity of said compressor arrangement relative to said evaporator means, said switching means having adding and subtracting inputs and outputs and a reset output which is made effective after each increase or decrease of the effective capacity of said compressor arrangement, said control system comprising:
data input means for receiving a data signal which is indicative of the temperature status of said evaporator means,
upper and lower temperature comparator means for receiving and comparing said data signal to predetermined upper and lower temperature limits of an operating range for said evaporator means and respectively outputting adding and subtracting control signals when said data signal is higher or lower than said limits,
a differentiating circuit having an input connected to said data input means and having adding and subtracting outputs, said circuit being operable to compare successive samples of said data signal and place outputs respectively on said adding and subtracting outputs thereof depending on whether the value of a succeeding data signal is larger or smaller than the value of a preceding data signal,
adding and subtracting time delay means having inputs connected respectively to said differentiating adding and subtracting outputs and having reset inputs connectable to said switching means reset output,
adding AND type gate means having inputs connected respectively to outputs of said adding time delay means and said upper temperature comparator means, and having an output connectable to said adding input of said switching means, and
subtracting AND type gate means having inputs connected respectively to outputs of said subtracting time delay means and said lower temperature comparator means, and having an output connectable to said subtracting input of said switching means 2. A method for controlling a refrigeration system of the type comprising evaporator means, a variable capacity compressor arrangement for supplying said evaporator means, and switching means between said control unit and said compressor arrangement, said compressor arrangement having adding and subtracting inputs which translate input signals thereon to respectively increase or decrease step by step the effective capacity of said compressor arrangement relative to said evaporator means, said switching means having adding and subtracting inputs and outputs and a reset output which is made effective after each increase or decrease of the effective capacity of said compressor arrangement, said method comprising the steps of:
receiving a data signal which is indicative of the temperature status of said evaporator means,
comparing said data signal with predetermined upper and lower temperature limits of an operating range for said evaporator means and respectively outputting adding or subtracting temperature control signals when said data signal is higher or lower than said limits,
processing said data signal to compare successive samples thereof and outputting separate adding or subtracting differentiated signals depending on whether the value of a succeeding data signal is respectively larger or smaller than the value of a preceding data signal,
delaying the further outputting of said differentiated signals respectively for predetermined periods of time initiated by said switching means reset output,
combining said adding temperature control and said adding differentiating signals in an ANDing manner and applying the resulting signal to said adding input of said switching means, and
combining said subtracting temperature control and said subtracting differentiating signals in an ANDing manner and applying the resulting signal to said subtracting input of said switching means.

* * * * *